Nov. 5, 1957     J. W. WELLS     2,811,985
PIPE LINE STOPPERS
Filed Nov. 6, 1953     3 Sheets-Sheet 1
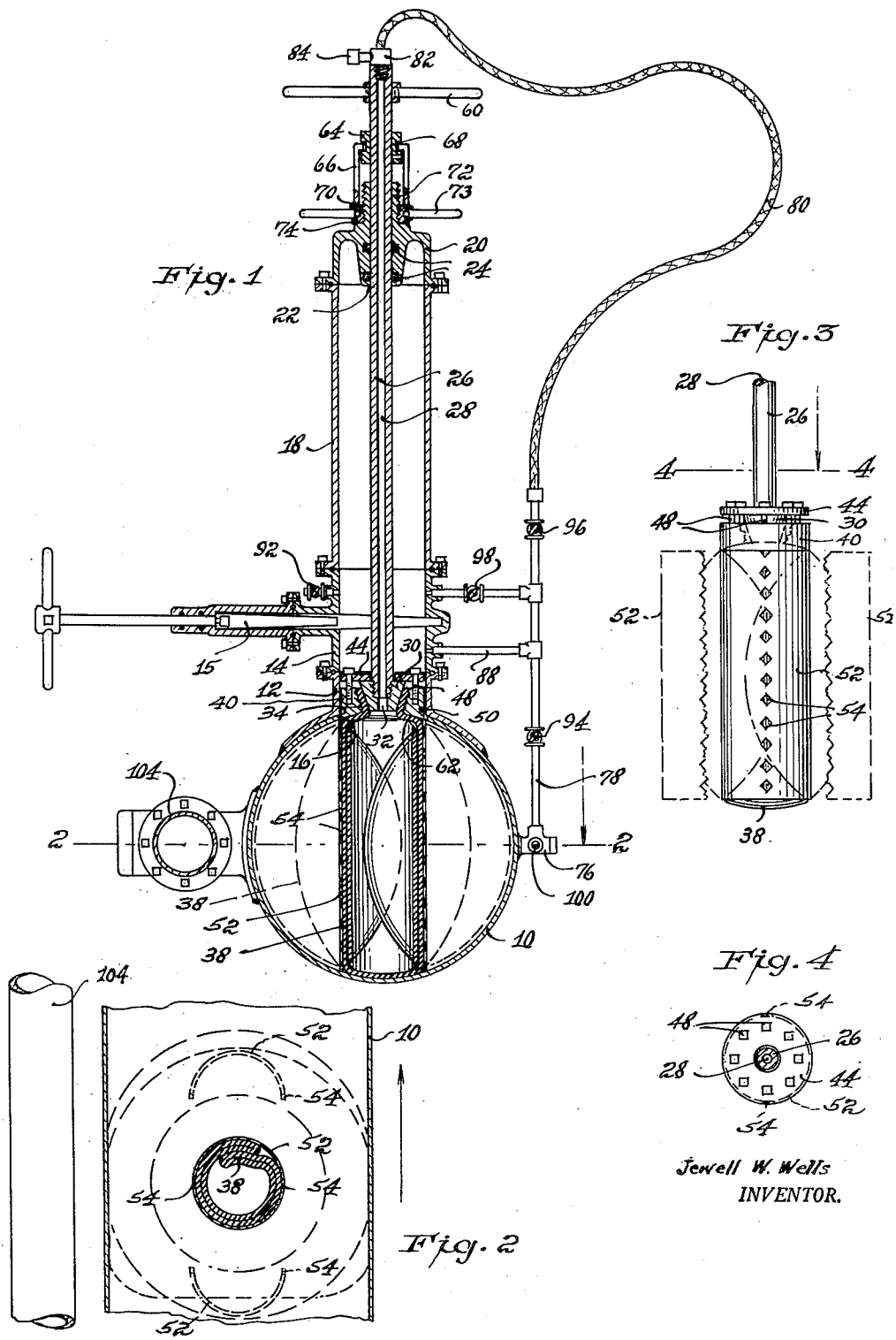
Jewell W. Wells
INVENTOR.

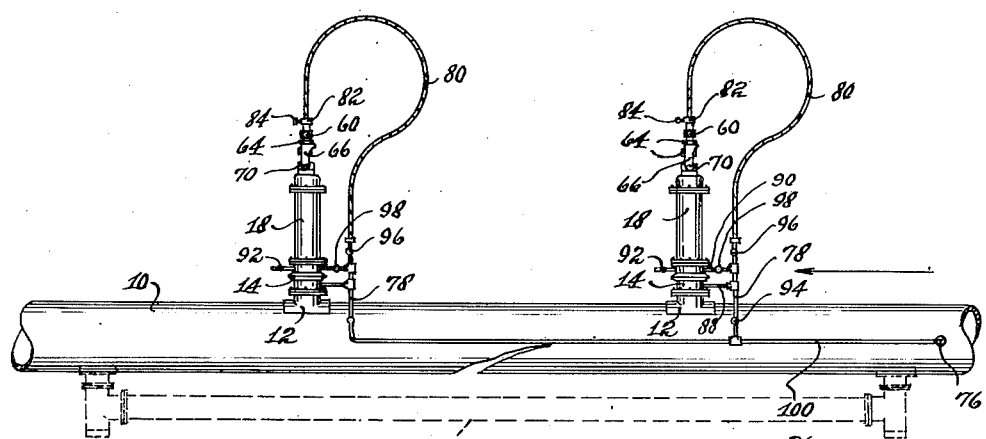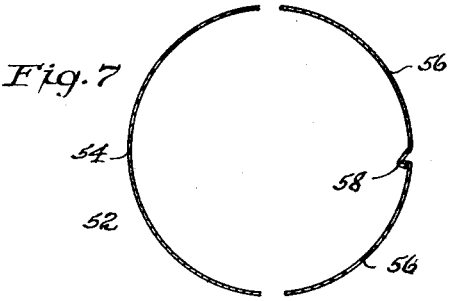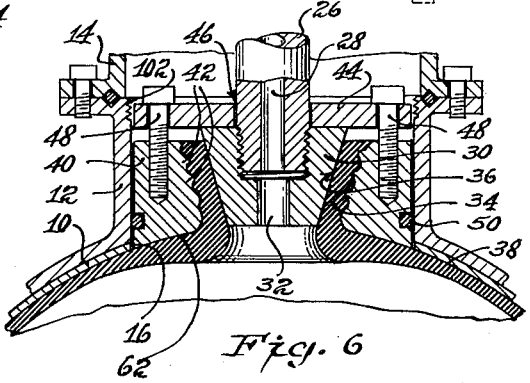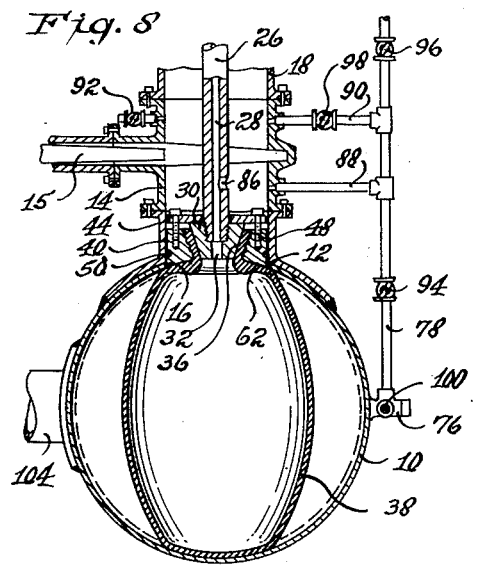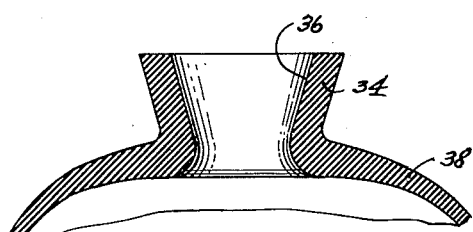
Jewell W. Wells
INVENTOR.

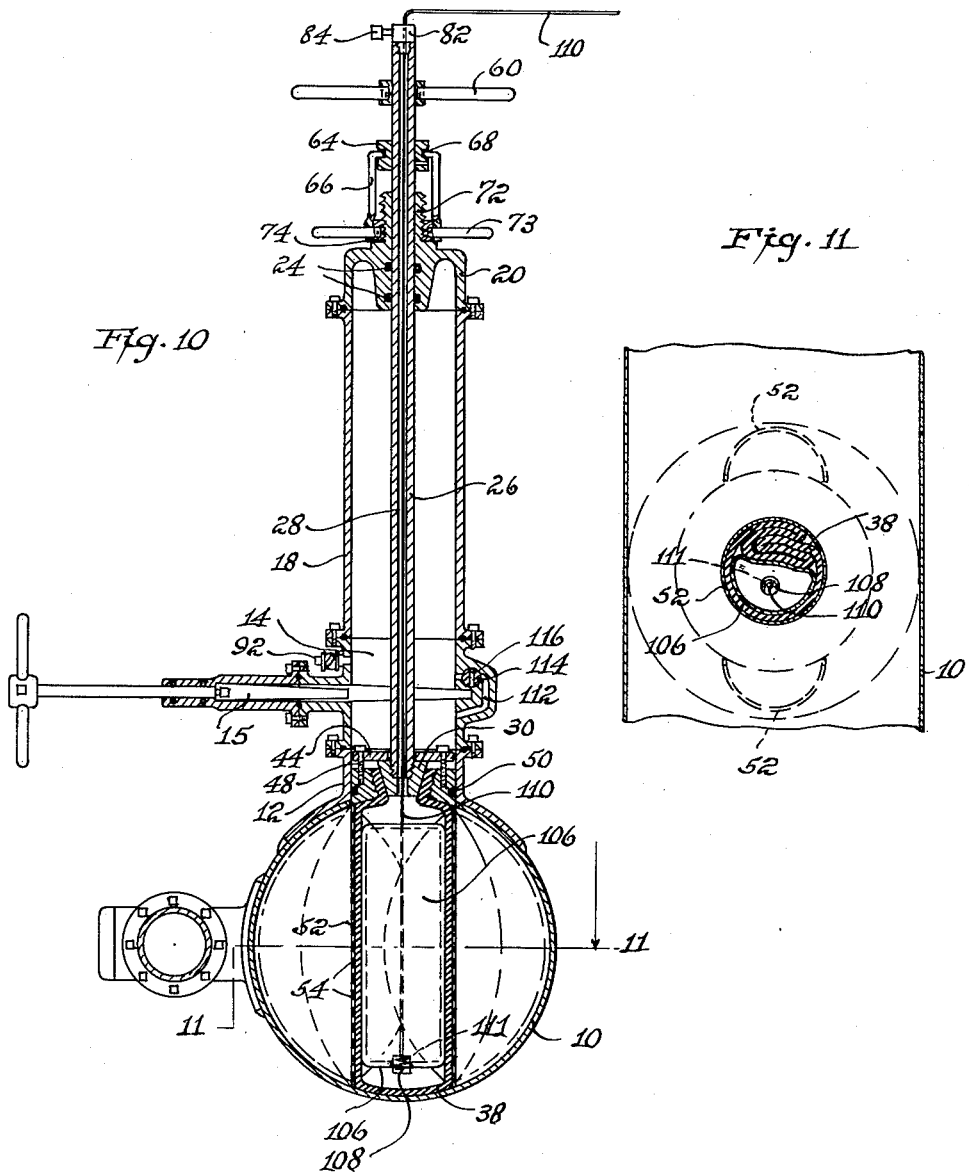

United States Patent Office 2,811,985
Patented Nov. 5, 1957

2,811,985

PIPE LINE STOPPERS

Jewell W. Wells, Trenton, N. J.

Application November 6, 1953, Serial No. 390,619

8 Claims. (Cl. 138—93)

This invention relates generally to equipment for stopping the flow of gas, oil or other fluid under relatively high pressure in a pipe line for any reason such, for example, as to repair or replace a broken or defective portion of the pipe line at a point where there is no permanent shut-off valve in the line.

In an operation of the type referred to it is necessary to drill a lateral opening in the pipe wall, insert therethrough into the pipe an expansible stopper member, and expand the stopper member into sealing engagement with the inner wall surfaces of the pipe. Such drilling and inserting procedure must be carried out in a pressure-tight casing sealed around the outer edge of the lateral opening in the pipe and the expanding operation performed by means outside said casing.

Heretofore, so far as I am aware, only solid types of stopper members, or plugs, in combination with mechanical means for expanding them inside a pipe have been employed for stopping the flow of fluid under high pressure in a pipe. Rubber bags inflated by air pressure have long been used for stopping the flow of gas in pipes under extremely low pressure, the bag being inserted in a lateral opening in the pipe without the use of a pressure casing or other means for preventing the escape of gas from the pipe during the plugging operation. However, such bags have not been used for stopping the flow of fluid under relatively high pressures, some of the reasons being the difficulty of inserting a bag in a pipe under high pressure, the failure of natural rubber to safely withstand high pressures and its tendency to deteriorate under the chemical action of certain fluids including gas and oil.

Certain types of synthetic rubber have now been developed with which bags made therefrom will not only withstand inflation under very high pressures, but are also highly resistant to deterioration from the action of gas, oil and other fluids.

Therefore, one of the principal objects of the present invention is to provide a resilient bag of strong and durable construction which is capable of being inserted into a pipe through a relatively small lateral opening therein and of being inflated by fluid pressure into sealing engagement with the inner wall of the pipe under sufficiently high fluid pressure to stop the flow of fluid under high pressure in the pipe.

Another object of this invention is to provide in combination with the resilient bag mentioned efficient means for inserting the bag through a sealed casing and a lateral opening in the pipe into the pipe and therein inflating said bag into sealing engagement with the inner wall of the pipe by high fluid pressure from a source outside the sealed casing.

A further object of the present invention is to provide in combination with the resilient bag mentioned various means for inflating said bag by fluid pressure including fluid pressure from the same pipe in which the flow is to be stopped, from a fluid pressure pump or fluid pressure generated or released within the bag.

A still further object of the invention is to provide means for maintaining the resilient bag in substantially cylindrical form of a lesser diameter than that of the lateral opening in the pipe during the insertion of the bag into the pipe said means being releasable by expansion of the bag under the force of pressure within the bag.

Another object of the invention is to provide means for fixing the resilient bag in the pipe in such a manner as to leave the periphery of the bag opposite the lateral opening in the pipe in coincidence with that of the adjacent inner wall of the pipe.

Other objects and advantages of my improved pipe stopper equipment will be apparent from the following specification in which reference is made to the accompanying drawings, in which Fig. 1 is a cross section of a pipe with one form of my improved pipe stopper equipment in position for inflation of the resilient bag;

Fig. 2 is a section taken on the line 2—2 of Fig. 1;

Fig. 3 is a side elevational view of one form of stopper assembly;

Fig. 4 is a section taken on the line 4—4 of Fig. 3;

Fig. 5 is a side view of a pipe with a pair of complete stopper units applied thereto;

Fig. 6 is a detail sectional view of the inlet end of the resilient bag and cooperative parts;

Fig. 7 is a transverse sectional view of a sleeve for maintaining the resilient bag in cylindrical form, and showing two forms of means for maintaining the sleeve in cylindrical condition about the bag;

Fig. 8 is a partial view similar to Fig. 1, but showing the resilient bag in normal, partially inflated form;

Fig. 9 is a detail sectional view of the inlet portion of one form of resilient bag;

Fig. 10 is a view similar to Fig. 1 but showing different means for inflating the resilient bag; and Fig. 11 is a section taken on the line 11—11 of Fig. 10.

Referring to the drawings in which like numerals designate like parts in the several views, 10 indicates a pipe line conducting fluid under pressure the flow in which is to be stopped by means of the equipment illustrated in connection therewith. As a preliminary step in the operation of stopping the flow a conventional type of fitting 12 is welded or otherwise sealed to the pipe and a gate valve 14 attached to the fitting, as shown. A drilling machine, which may be of conventional type (not shown) is attached to the outer end of the gate valve and a lateral opening 16, of a lesser diameter than that of the pipe, is drilled through the wall of the pipe. The drilling machine is then detached from the valve and a fluid-tight casing 18 attached to the valve as shown. This casing is provided with a removable closure 20 for its outer end, this closure having therein a central opening surrounded at its edges by a pair of packing rings 24 which are in concentric relation with the lateral opening 16 in the pipe 10.

Extending slidably through the packing rings 24 is a bag inserting shaft 26 having therein a central opening or passage 28 extending therethrough. At one end this shaft is threadedly or otherwise fixedly connected to the back end of a tapered plug 30 which has therein a through opening 32. The tapered plug 30 is inserted in the flared neck portion 34 defining a fluid inlet 36 in a resilient bag 38. A collar 40 embraces the outer wall surface of the neck portion 34 and this collar is of an outer diameter slightly less than that of the inner wall of the fitting 12. The inner wall of the collar is flared to correspond with the flare or the neck portion 34, and may be provided with annular corrugations 42 which engage the outer surface of the neck portion 34. The back or outer end of the plug 30 projects some distance axially from the outer end of the neck portion 34 of the bag 38 and is abutted by a pressure plate 44 which has a central opening 46 through which the inserting shaft 26 projects. Headed screws 48 projecting through openings in the edges of the plate 44 into the outer face of the collar 40 may be used to force the plug 30 into the flared end of the resilient bag 38 thereby clamping the wall of the neck portion 34 of the bag firmly between the plug and the inner wall of the collar 40. A packing ring 50 may be mounted between the outer surface of the collar 40 and the inner wall of the fitting 12 to preclude the passage of fluid between the pipe 10 and the casing 18 through the lateral opening 16 outside the bag 38.

The resilient bag 38 may be of various normal forms such, for example, as oval, as shown in Figs. 1 and 8, or of normally globular form. Also for small pipes it may be of cylindrical form. In order to maintain the bag in substantially cylindrical form of a lesser diameter than that of the lateral opening 16 in the pipe 10, during its insertion into the pipe, an embracing member such as a relatively thin cylindrical sleeve 52, made of metal or other suitable material, may be placed over the bag with the latter in folded, or rolled condition, as clearly shown in Figs. 1 and 2. In Fig. 8 the bag is shown partially inflated to normal form, the sleeve having been released by breakage or disengagement of the means for maintaining it in cylindrical form by expansion of the inflated bag. As shown in Figs. 1 to 4 the sleeve 52 may be provided with diametrically opposed longitudinal rows of openings 54 of such shape as to facilitate breakage of the sleeve into two semi-cylindrical pieces by expansion of the bag under the force of the fluid pressure admitted into the bag through the opening 28 in the inserting shaft 26. The rows of openings 54 are preferably arranged transversely of the pipe, so that the two pieces of the sleeve will be ejected longitudinally of the pipe away from the bag, as indicated in dotted lines in Fig. 2. Another form of means for maintaining the sleeve 52 in cylindrical condition is shown at the right of Fig. 7 in which the sleeve is made in two semi-cylindrical halves with their adjoining edges interlocked as indicated at 58. Expansion of the bag will cause the edges to pull apart and release the two halves of the sleeve. The diametrically opposed, interlocked edges will be arranged transversely of the pipe 10 in the same manner as the rows of openings 54. This is accomplished by aligning the openings with the handles 60 of the inserting shaft 26 or by other suitable indicator device. As shown more clearly in Fig. 6 the wall of the portion of the resilient bag containing the fluid inlet 34 may be made of substantially greater thickness than that of other portions of the wall to compensate for the strains to which the neck portion of the bag is subjected under inflation. The sleeve may also be made of frangible material scored in a manner to cause it to break apart at predetermined places.

The surface 62 of the collar 40 is arcuate to correspond with the inner wall of the pipe 10. Means for fixing this surface in coincidence with the inner wall of the pipe 10 includes a collar 64 adjustably mounted on the inserting shaft 26 and a yoke 66 the outer end of which engages a groove 68 in the collar. The yoke is hingedly connected to a nut 70 which is threaded on an extension 72 of the closure 20 and rotatable by means of handles 73. The inward axial movement of the nut is limited by a shoulder 74 of the extension 72. The collar 64 is adjusted so that when the nut 70 abuts the shoulder 74 the arcuate surface 62, being first placed under correct angular adjustment in relation to the pipe 10, as later described, will be in precise coincidence with the inner wall of the pipe. The bag 38 opposite the lateral opening 16 will then lie smoothly against the surface 62 and the adjacent inner portion of the pipe 10 wall when the bag is fully inflated into sealing engagement therewith.

Fluid pressure for inflating the resilient bag 38 may be conducted from the pipe 10 through a lateral fitting 76, pipe 78, flexible hose 80 and a fitting 82 into the passage 28 of the inserting shaft 26.

In the arrangement illustrated in Fig. 1 the fluid pressure for inflating the resilient bag 38 into sealing engagement with the inner wall of the pipe 10 is conducted entirely through the inserting shaft 26. The pressure may be supplied solely from that in the pipe 10 through fitting 82 and fluid passage 28 of the inserting shaft into the fluid inlet 36 of the resilient bag, or, if desired, the pressure from the pipe 10 may be supplemented by a higher pressure from a fluid pressure pump (not shown) through a connection 84 communicating with the passage 28. In the arrangement shown in Fig. 8 the fluid pressure from the pipe 10 may enter the fluid passage 28 through a lateral opening 86 at the inner end of the inserting shaft. Lateral pipes 88 and 90 supply fluid pressure into the closed casing 18 above and below the gate 15. This permits independent equalization of pressure above the valve with that in the pipe when the resilient bag is inserted therein, with the gate valve closed. The pressure above the valve can be relieved when desired through drain valve 92. Other valves 94, 96, and 98 are located in pipes 78 and 90 to control the flow of fluid through those pipes, as indicated.

As indicated in Fig. 5 one of the stopper units described is placed on each side of the portion of the pipe 10 to be repaired or replaced. The fitting 76 may be installed in the pipe as far upstream from the break or leak in the pipe as necessary to obtain adequate fluid pressure for inflation of the resilient bags, both of which can be supplied with pressure through a pipe 100 connecting with the pipes 78.

Before the headed screws 48 are inserted into the collar 40 the latter is angularly adjusted to bring the arcuate surface 62 into some predetermined relation with the handles 60 of the inserting shaft, as, for example, in transverse relation, and with the opposed rows of openings 54 of the sleeve 52 aligned with the handles 60. Thus, when the handles are aligned transversely of the pipe 10 during the insertion of the resilient bag into the pipe it will be known to the operator that the rows of openings 54 are aligned transversely of the pipe and that the arcuate surface 62 of the collar 40 is axially aligned with the pipe 10.

Before the resilient bag 38 is inserted into the casing 18 the gate 15 of the valve 14 is closed. After the bag has been inserted into the casing 18 above the gate 15 the closure 20 is sealed to the outer end of the casing, as illustrated in Fig. 1. The valve 98 is then opened to equalize the pressure above the gate with that in the pipe and the casing below the gate. The gate 15 is then opened and the inserting shaft 26 move axially toward the pipe with the bag 38 until the nut 70 abuts the shoulder 74. The shaft is then rotated until the handles 60 are in alignment transversely of the pipe 10. The resilient bag will then be completely in the pipe with all parts of the stopper assembly in correct relation for inflation of the bag into sealing engagement with the pipe wall. Fluid pressure from the pipe or a pump, or both, is then admitted into the bag through the passage 28 in the inserting shaft, thereby stopping the downstream flow or the back flow depending on the side of the break or leak in the pipe on which the stopper unit is installed.

After the pipe has been repaired the resilient bag 38 can be deflated by detaching the flexible tube connection 82 from the inserting shaft thus permitting the fluid to escape and the bag can then be withdrawn through the valve 14, after which the gate can be closed and the casing 18 and assembled parts removed from the valve. If desired, the outlet of the fitting 12 may be internally threaded, as indicated at 102, Fig. 6, and a plug (not shown) threaded into the outlet through the valve 14, which may then be removed from the fitting 12.

If desired, a by-pass 104 may be installed to conduct fluid around the portion of pipe 10 to be repaired or replaced, so that fluid can be supplied to users on the downstream portion of the line while repairs are being made in the main line, as is usual in such operations.

As illustrated in Figs. 10 and 11, the resilient bag 38 may be inflated into adequate sealing engagement with the interior wall of the pipe 10 by fluid pressure from gas or air stored in a container 106 under a substantially higher pressure per square inch than that required in the inflation of the bag, to compensate for expansion in the bag. The fluid may be sealed in the container 106 by means of a plug 108 which may be of a fusible character and destructible through an electrical circuit conducted by a cable 110, extending through passage 28 of inserting shaft 26 and communicating with a heating element 111 carried by the plug 108 in such a manner that the plug will be fused and destroyed when an electrical current is conducted through the cable 110 from a source outside the casing 18. Means for equalizing the fluid pressure below or above the gate 15 with that in pipe 10 or the bag 38 may include a by-pass 112 in the casing of the valve 14, the passage of fluid through the by-pass being controlled by a valve 114 having a transverse fluid passage 116 which can be rotated into and out of communication with the by-pass 112. In the event that a higher fluid pressure than that supplied from the container 106 is required such supplemental pressure can be supplied by a conventional fluid pressure pump (not shown) through the fitting 84 and passage 28 of the inserting shaft 26.

The use of a resilient bag affords distinct advantages over solid stoppers in stopping the flow of fluid under high pressure in pipe lines, among them being that since only a relatively small lateral opening in the pipe is necessary for the insertion of a resilient bag only light drilling equipment is necessary, and such equipment can be flown to the location of a broken pipe or leak and the stoppers quickly applied to the pipe to stop the loss of gas, oil or other fluid. Such advantages are particularly important in connection with very large pipe lines, in which a leak or break in the line may occur in swampy, woody, or other terrain difficult or impossible to approach in heavy vehicles.

Obviously, various changes in the construction of my improved pipe stopper equipment may be made within the spirit and scope of my invention. For example, various methods actuated electrically through the cable 110 may be used in the introduction of fluid pressure into the resilient bag 38, such as making the plug 106 in the form of an electro-magnetic valve; making the plug of an explosive composition destructible by detonation; or generating the pressure within the bag by means of certain acids held apart in the container 106 and brought into contact with each other to form a gas by destruction or release of the means holding them apart. Therefore, it should be understood that the embodiments of the invention shown and described are intended to be illustrative only and not restricted to the specific construction shown.

I claim:

1. In combination with a pipe provided with a lateral opening of a lesser diameter than that of said pipe and a cylindrical casing sealed at one end around the outer edge of said opening, said casing projecting axially from said opening and having therein a gate valve for sealing its outer portion from said opening, equipment for stopping the flow of fluid under pressure in said pipe including a removable closure for the outer end of said casing, said closure having an opening with a packing ring therein in concentric relation with the lateral opening in said pipe, a resilient bag for insertion through said casing into said pipe, said bag being provided with a hollow reduced neck portion at its outer end defining an opening therein, means engaging said bag for maintaining it in substantially cylindrical form of a lesser diameter than that of the lateral opening in said pipe, said means being rupturable by expansion of said bag under the force of pressure therein, an inserting shaft for said bag extending slidably through the packing ring in said closure, a coupling for connecting said bag with said shaft, said coupling including a collar embracing said neck portion, a plug in the opening in said bag, said plug having a through axial opening therein, means for clamping the wall of said neck portion between said collar and said plug, and means for connecting said inserting shaft to said plug with the inner end of its axial opening in communication with the opening in said bag through the axial opening in said plug; a source of fluid pressure, and means cooperative with the openings in said inserting shaft and bag and with said source of fluid pressure for releasing fluid pressure into said bag for inflating said bag into sealing engagement with the inner wall of said pipe.

2. Equipment for stopping the flow of fluid under pressure in a pipe according to claim 1 in which the neck portion of the resilient bag and the inner wall of said collar are outwardly flared and said plug is tapered to fit within the neck portion of said bag, and including screw pressure means in abutment with said plug for forcing said plug into wedging action against the wall of said neck portion and the inner wall of said collar.

3. Equipment for stopping the flow of fluid under pressure in a pipe according to claim 2 in which said screw pressure means in abutment with said plug includes a pressure plate having a central opening through which the inserting shaft projects and a plurality of headed screws projecting through holes in the edges of said plate into threaded holes in said collar.

4. In combination with a pipe provided with a lateral opening of a lesser diameter than that of said pipe and a cylindrical casing sealed at one end around the outer edge of said opening, said casing projecting axially from said opening and having therein a gate valve for sealing its outer portion from said opening, equipment for stopping the flow of fluid under pressure in said pipe including a removable closure for the outer end of said casing, said closure having an opening with a packing ring therein in concentric relation with the lateral opening in said pipe, a resilient bag adapted for insertion through said casing into said pipe, means engaging said bag for maintaining it in substantially cylindrical form of a lesser diameter than that of the lateral opening in said pipe, said means being rupturable by expansion of said bag under the force of pressure therein, an inserting shaft for said bag extending slidably through the packing ring in said closure, a coupling for connecting said bag with said shaft, said bag having an opening in its outer end, said shaft having therein a through axial opening in communication with the opening in said bag, screw means on said cylindrical casing cooperative with an abutment on said inserting shaft for fixing the outer periphery of said bag adjacent the lateral opening in said pipe in coincidence with the inner periphery of said pipe, a source of fluid pressure, and means cooperative with the openings in said inserting shaft and bag and with said source of fluid pressure for releasing fluid pressure into said bag for inflating said bag into sealing engagement with the inner wall of said pipe.

5. In combination with a pipe provided with a lateral opening of a lesser diameter than that of said pipe and a cylindrical casing sealed at one end around the outer edge of said opening, said casing projecting axially from said opening and having therein a gate valve for sealing its outer portion from said opening, equipment for stopping the flow of fluid under pressure in said pipe including a removable closure for the outer end of said casing, said closure having an opening with a packing ring therein in concentric relation with the lateral opening in said pipe, a resilient bag adapted for insertion through said casing into said pipe, a cylindrical sleeve of a lesser diameter than that of the lateral opening in said pipe encasing said bag, said sleeve being rupturable into a plurality of pieces, thereby entirely releasing it from contact with said bag, by expansion of said bag under the force of pressure therein, an inserting shaft for said bag extending slidably through the packing ring in said closure, a coupling for connecting said bag with said shaft, said bag having an opening in its outer end, said shaft having therein a through axial opening in communication with the opening in said bag, a source of fluid pressure, and means cooperative with the openings in said inserting shaft and bag and with said source of fluid pressure for releasing fluid pressure into said bag for inflating said bag into sealing engagement with the inner wall of said pipe.

6. Equipment for stopping the flow of fluid under pressure in a pipe according to claim 5 in which said cylindrical sleeve is provided with a plurality of annularly spaced rupturable portions extending throughout its entire length so that said sleeve under expansion of said bag will be separated into a plurality of segmental pieces.

7. Equipment for stopping the flow of fluid under pressure in a pipe according to claim 5 in which said cylindrical sleeve is provided with two diametrically opposed rupturable portions extending throughout its entire length so that said sleeve under expansion of said bag will be separated into two substantially equal semi-cylindrical pieces.

8. Equipment for stopping the flow of fluid under pressure in a pipe according to claim 7 and including indicator means carried by the outer portion of said inserting shaft in cooperation with said sleeve for aligning the rupturable portions transversely of the pipe so that the two semi-cylindrical pieces of the sleeve when separated by expansion of said bag will be ejected therefrom longitudinally of said pipe.

References Cited in the file of this patent

UNITED STATES PATENTS

| | | |
|---|---|---|
| 1,828,381 | Schuyler | Oct. 20, 1931 |
| 1,860,855 | Gardner | May 31, 1932 |
| 1,946,138 | Gardner | Feb. 6, 1934 |
| 2,171,943 | Mueller | Sept. 5, 1939 |
| 2,389,792 | Lippincott | Nov. 27, 1945 |
| 2,425,483 | Mueller et al. | Aug. 12, 1947 |
| 2,448,118 | Pellettere | Aug. 31, 1948 |
| 2,493,891 | McCarty | Jan. 10, 1950 |
| 2,532,143 | Breit | Nov. 28, 1950 |

FOREIGN PATENTS

| | | |
|---|---|---|
| 333,357 | Great Britain | Aug. 14, 1930 |